United States Patent
Weiler

(10) Patent No.: US 7,134,667 B2
(45) Date of Patent: Nov. 14, 2006

(54) ARRANGEMENT COMPRISING A SLINGER ASSOCIATED WITH A SHAFT BEARING AND A GASKET ASSOCIATED WITH A SEALING GAP

(75) Inventor: Wolfgang Weiler, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 15 days.

(21) Appl. No.: 10/476,981

(22) PCT Filed: Apr. 16, 2002

(86) PCT No.: PCT/DE02/01403

§ 371 (c)(1),
(2), (4) Date: May 24, 2004

(87) PCT Pub. No.: WO02/090802

PCT Pub. Date: Nov. 14, 2002

(65) Prior Publication Data

US 2004/0188946 A1   Sep. 30, 2004

(30) Foreign Application Priority Data

May 9, 2001 (DE) .................. 101 22 440

(51) Int. Cl.
F16J 15/42 (2006.01)
F16C 33/80 (2006.01)
(52) U.S. Cl. ............ 277/424; 277/429; 277/423; 277/347; 384/135; 384/478
(58) Field of Classification Search ................ 277/423, 277/424, 429, 426, 347, 348, 349; 384/135, 384/478

See application file for complete search history.

(56) References Cited

U.S. PATENT DOCUMENTS

| 1,908,956 | A | * | 5/1933 | Chievitz | 384/489 |
|---|---|---|---|---|---|
| 1,978,739 | A | | 10/1934 | Brittain, Jr. | |
| 2,063,738 | A | * | 12/1936 | Hedgcock | 384/558 |
| 2,071,947 | A | * | 2/1937 | Oelkers et al. | 384/459 |
| 2,254,862 | A | | 9/1941 | Haeberlein et al. | |
| 2,486,123 | A | * | 10/1949 | Cottrell | 105/219 |
| 2,524,124 | A | * | 10/1950 | Gyana | 277/423 |
| 2,622,945 | A | * | 12/1952 | Nickle et al. | 384/477 |
| 2,631,071 | A | * | 3/1953 | Alden | 384/487 |
| 3,004,782 | A | * | 10/1961 | William | 277/347 |
| 3,510,138 | A | * | 5/1970 | Bowen et al. | 277/571 |
| 3,532,399 | A | * | 10/1970 | Gray | 277/347 |
| 4,460,180 | A | * | 7/1984 | Koistinen | 277/304 |
| 5,636,848 | A | * | 6/1997 | Hager et al. | 277/420 |
| 6,619,851 | B1 | * | 9/2003 | Vogelgesang | 384/475 |

FOREIGN PATENT DOCUMENTS

| CH | 658 707 A | 11/1986 |
|---|---|---|
| DE | 379 164 C | 8/1923 |
| DE | 494 347 C | 3/1930 |
| DE | 583 156 C | 8/1933 |
| DE | 31 515 | 9/1964 |

(Continued)

*Primary Examiner*—Alison K. Pickard
(74) *Attorney, Agent, or Firm*—Crowell & Moring LLP

(57) ABSTRACT

A sealing arrangement for turbomachines with a shaft bearing, a throw-off ring and a shaft seal which is assigned to a sealing gap and has a seal housing wherein opposing faces of the throw-off ring and the seal housing form an annular gap for centrifuging out dirt and oil particles.

6 Claims, 1 Drawing Sheet

FOREIGN PATENT DOCUMENTS

| | | |
|---|---|---|
| DE | 1 991 259 U | 8/1968 |
| DE | 35 44 783 A1 | 6/1987 |
| DE | 37 37 932 A | 5/1989 |
| EP | 0 015 739 A1 | 9/1980 |
| GB | 1 308 098 A | 2/1973 |

* cited by examiner

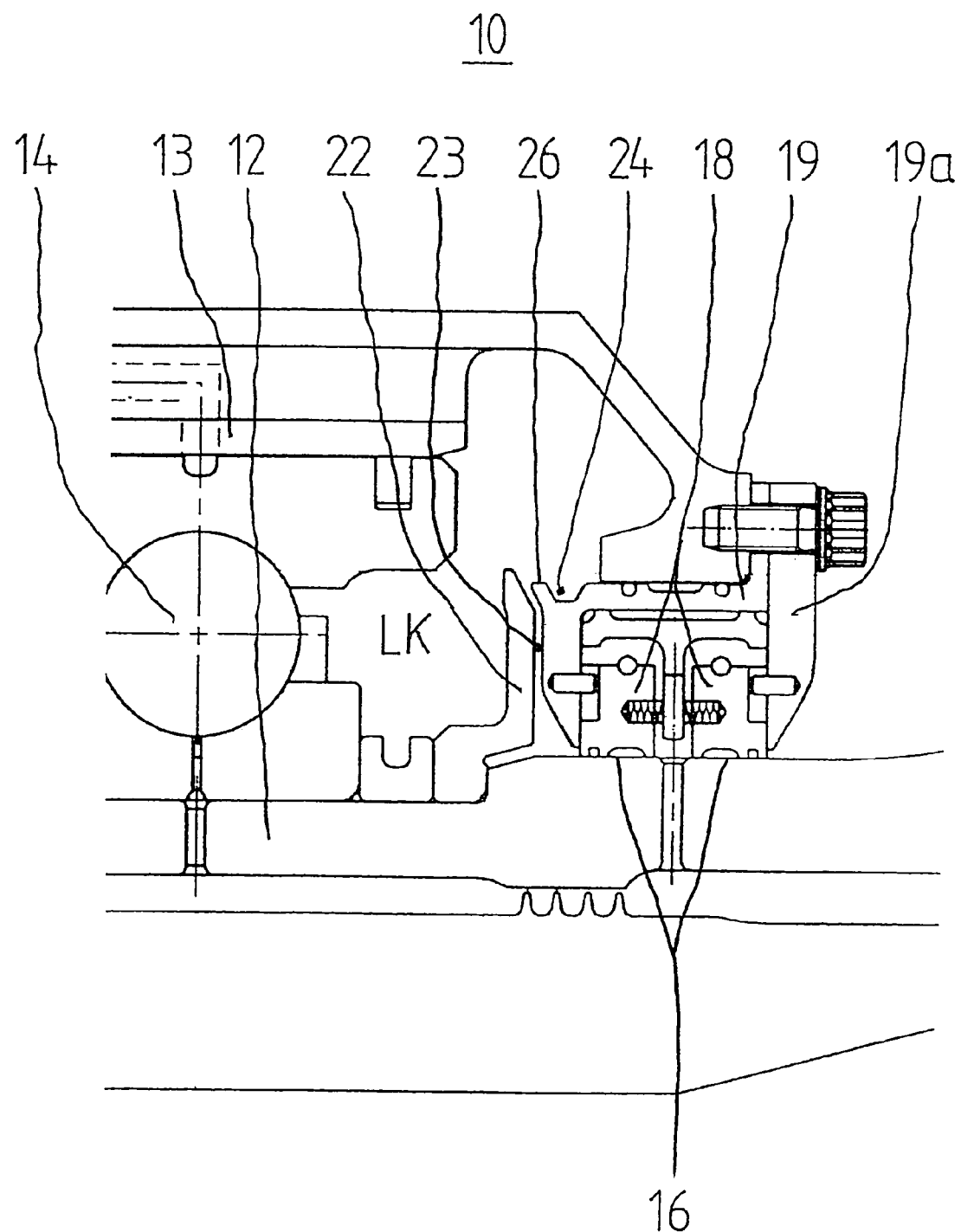

ARRANGEMENT COMPRISING A SLINGER ASSOCIATED WITH A SHAFT BEARING AND A GASKET ASSOCIATED WITH A SEALING GAP

This application claims the priority of German patent document 101 22 440.0, filed 9 May 2001 (PCT International Patent Application No. PCT/DE02/01403, filed 16 April 2002), the disclosure of which is expressly incorporated by reference herein.

BACKGROUND AND SUMMARY OF THE INVENTION

The invention relates to sealing a shaft of a turbo machine. Specifically, the invention pertains to an arrangement with a throw-off ring assigned to a shaft bearing and with a seal assigned to a sealing gap and having a seal housing, in particular for turbomachines.

Particularly where turbomachines are concerned, as is known, the seal between shaft and housing, said seal being designed, for example, as a gap, slide-ring or brush-type seal, must be contactless because of the high circumferential speed.

Furthermore, direct contact between the medium to be sealed off, for example lubricant, and specific structural elements of the seal leads, as a result of contamination and/or chemical changes, to deposits, such as dirt and/or oil-carbon deposits on the seal elements. Experience has shown that this is detrimental to the sealing function and often results in the failure of the seal.

An object of the invention is to provide a novel arrangement of the type initially mentioned, in particular for turbomachines, the design and arrangement of which allows trouble-free operation in all the operating states of the turbomachine equipped with it, including during the standstill of the latter.

Proceeding from an arrangement of the type initially mentioned, this object is achieved, according to the invention, in that the mutually confronting regions of the seal housing and of the throw-off ring are designed initially to run radially and subsequently conically outward and, enclosing an annular gap between them, are arranged on the associated structural element in such a way that, during the rotation of one of the structural parts, the medium entering the annular gap has imparted to it a turbulent flow, by means of which heavy constituents contained in the medium are centrifuged out.

By structural parts, such as the seal housing and throw-off ring, present in any case per se, being designed and arranged according to the invention, the feared dirt and/or oil-carbon deposit on seal elements and the adverse consequences associated with this are reliably avoided.

According to a further feature of the invention, an annular groove and a projection are arranged on the seal housing.

By virtue of this measure, when the arrangement is at a standstill, oil running down on the walls of the sealed chamber receiving the arrangement is prevented from penetrating into the seal.

The design according to the invention of the arrangement is surprisingly simple and, in all operating states, reliably ensures the discharge of media located in the bearing chamber, in particular of oil mist and of the heavy constituents, contained in it, of dirt and lubricating-oil droplets, so that deposits in the region of a seal which lead to the failure of the latter are prevented in all the operating states of the turbomachine equipped with it.

Other objects, advantages and novel features of the present invention will become apparent from the following detailed description of the invention when considered in conjunction with the accompanying drawings.

BRIEF DESCRIPTION OF THE DRAWINGS

FIG. 1 shows a partial axial section through a bearing chamber of a turbomachine with a sealing arrangement in accordance with an embodiment of the present invention.

DETAILED DESCRIPTION OF THE DRAWINGS

A turbomachine of conventional form of construction, designated as a whole by the reference numeral 10, comprises, in a bearing chamber LK illustrated only partially, a rotary bearing 14 arranged between a shaft 12 and a housing part 13 and also a seal 18 which is assigned to the shaft and which is surrounded by a seal housing 19 to which, in turn, a cover 19a is assigned. The shaft 12 and the seal 19 are contactless due to the sealing gap 16. The rotary bearing 14 is assigned a throw-off ring 22 placed on the shaft 12 and directly adjacent to the seal 18.

The mutually confronting regions of the throw-off ring 22 and of the seal housing 19, that is to say their outer faces, are in each case configured in such a way that, running initially radially to the shaft 12 and subsequently conically outward, they enclose an annular gap 23 between them. The outer faces forming the annular gap may run essentially parallel to one another or else so as to diverge inward or outward.

The seal housing 19 has integrally formed onto it, on the side facing the throw-off ring, and so as to face away from the annular gap 23, an annular groove 24 located on the circumference and a projection 26 which extend over the entire circumference.

The operation of the above-described arrangement is as follows:

A medium located in the annular gap 23, that is to say between the mutually confronting outer faces of the throw-off ring 22 and of the seal housing 19, for example air, but, in particular, oil mist caused by the rotary bearing 14, has imparted to it, when the rotation of the shaft 12 commences, a turbulence which, as a result of the selected shaping of the outer faces of the throw-off ring and the seal housing, takes the form of a turbulent flow which is directed radially outward and by means of which all the heavy constituents, in particular even lubricating-oil droplets, contained in the medium are centrifuged out.

All deposits, which have hitherto led to undesirable operating faults, on structural elements of the seal 18 assigned to the sealing gap 16 are thereby avoided.

Even the oil drops which occur when the turbomachine is at a standstill and which pass through the annular gap, running conically in the outer region, onto the rear side of the throw-off ring, said rear side rotating when the turbomachine is in operation, are centrifuged out in the way as described above.

The annular groove arranged on the seal housing, in conjunction with the projection likewise arranged there, prevent, when the arrangement is at a standstill, oil which runs down on the walls of the bearing chamber from penetrating into the seal.

The width of the annular gap located between the mutually confronting faces of the seal housing and of the throw-off ring is typically between 0.5 and 1.2 mm, and preferably 0.8 mm.

It is advantageous if at least one face of the throw-off ring and seal housing is roughened.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An arrangement for turbo machines having a rotating shaft, a throw-off ring adjacent to a shaft bearing and with a seal adjacent to a sealing gap between the shaft and the seal and having a seal housing, wherein the mutually confronting regions of the seal housing and of the throw-off ring initially run radially and subsequently conically outward and enclose an annular gap between them, the annular gap terminating in a region of the turbomachine not radially aligned with the seal, the mutually confronting regions of the seal housing and the throw-off ring are arranged in such a way that, during the rotation of the shaft, a medium located in the annular gap has imparted to it a turbulent flow, by means of which heavy constituents contained in the medium are centrifuged out, the seal housing has integrally formed on it an annular groove located on the circumference and a projection which extend over the entire circumference, and the mutually confronting regions of the throw-off ring and of the seal housing run so as to diverge from one another.

2. The arrangement as claimed in claim 1, wherein the width of the annular gap located between the mutually confronting faces of the seal housing and of the throw-off ring is between 0.5 and 1.2 mm.

3. The arrangement as claimed in claim 1, wherein at least one face of the throw-off ring and seal housing is roughened.

4. A seal arrangement for a rotating shaft of a turbomachine, comprising:
   a shaft bearing concentrically disposed about the rotating shaft;
   a throw-off ring disposed adjacent to the shaft bearing;
   a seal concentrically disposed about the rotating shaft; and
   a seal housing in which the seal is located, the seal housing disposed adjacent to the throw-off ring,
   wherein a region of the seal housing and a region of the throw-off ring extend opposite one another in a radial direction outward to a first radius, extend opposite one another at an angle to the radial direction less than ninety degrees from the first radius to a second radius, and enclose an annular gap, the annular gap terminating in a region of the turbomachine not radially aligned with the seal, the seal housing has integrally formed on it an annular groove located on the circumference and a projection which extend over the entire circumference, and the mutually confronting regions of the throw-off ring and of the seal housing run so as to diverge from one another.

5. The arrangement as claimed in claim 4, wherein the width of the annular gap located between the mutually confronting faces of the seal housing and of the throw-off ring is between 0.5 and 1.2 mm.

6. The arrangement as claimed in claim 4, wherein at least one face of the throw-off ring and seal housing is roughened.

* * * * *